Aug. 2, 1949.  E. A. DE ZUBAY  2,477,584
COMBUSTION APPARATUS
Filed Sept. 11, 1946
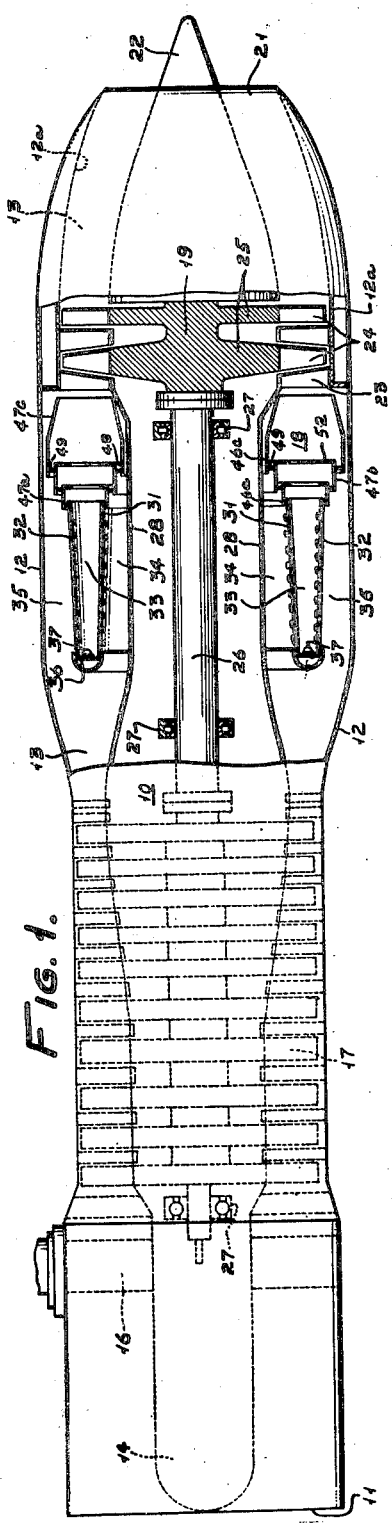
INVENTOR
EGON A. DE ZUBAY.
BY
ATTORNEY Patented Aug. 2, 1949

2,477,584

UNITED STATES PATENT OFFICE 2,477,584

COMBUSTION APPARATUS

Egon A. De Zubay, Bellevue, Pa., assignor to Westinghouse Electric Corporation, East Pittsburgh, Pa., a corporation of Pennsylvania Application September 11, 1946, Serial No. 696,159

8 Claims. (Cl. 60—44)

This invention relates to combustion apparatus, more particularly to combustion chamber structure, and has for an object to provide improved apparatus of this character.

Another object of the invention is to provide, in a combustion chamber, novel means for insuring thorough mixing of secondary air with the products of combustion.

Yet another object of the invention is to provide, in a combustion chamber, novel means for admitting secondary air and for directing it transversely to the normal path of flow of gases through the chamber.

These and other objects are effected by the invention as will be apparent from the following description and claims taken in connection with the accompanying drawings, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged fragmentary view of a portion of the structure shown in Fig. 1, and comprising a longitudinal sectional view of part of the combustion apparatus;

Fig. 3 is a sectional view, taken along the line III—III of Fig. 2, looking in the direction indicated by the arrows; and, Fig. 4 is a view similar to Fig. 2, but showing a modified arrangement of baffles.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawings more in detail, the power plants shown in Fig. 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine discs 25 and then are discharged through the propulsion nozzle 21 to propel the aircraft.

By reference to Fig. 1 it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross-sectional area from its upstream end to its downstream end. Conversely, the inner and outer overlapping air spaces 34 and 35, the former defined by the walls 28 and 31 and the latter by the walls 12 and 32, decrease in cross-sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions substantially parallel to the longitudinal axis of the power plant.

In the construction herein illustrated, the burner space 33 is comprised by an upstream igniting and burning portion 40 defined by annular walls 41 and 42, perforated at 43 for admission of primary air, and a downstream mixing and cooling portion 45 defined by the annular walls 46a, 46b and 46c and 47a, 47b and 47c, arranged in stepped relation with their adjacent ends radially spaced and slightly overlapped, the radial spacing providing annular openings 48 for entrance of secondary air axially to the mixing and cooling portion. The radial spacing of the adjacent annular walls 46a, 46b and 46c and of 47a, 47b and 47c may be maintained by the provision of radial struts or braces 49.

In order that proper mixing of the secondary air entering at 48 with the hot gases and products of combustion from the burning portion 40 may be assured, the axially entering secondary air is directed radially inward by suitable baffles in the form of radial inwardly-directed flanges 51 and 52 at the downstream ends of the annular walls 47a and 47b. Similar radial outwardly-directed flanges 53 and 54 are disposed at the downstream ends of the annular walls 46a and 46b.

The flanges 51, 52, 53 and 54 cause a major portion of the entering secondary air to be directed radially towards the center of the annular stream of hot products of combustion to thoroughly mix with and cool the latter.

In Fig. 4 there is shown a modification wherein annular walls 56a, 56b and 56c correspond to walls 46a, 46b and 46c, respectively, of Fig. 3, and annular walls 57a, 57b and 57c correspond to walls 47a, 47b and 47c, respectively, of Fig. 3. In this construction there is no radial flange on the wall 56a or on the wall 57b, with the result that the flange 58 on wall 57a and the flange 59 on wall 56b are disposed in staggered relation, thereby serving to break up any tendency to formation of jets, as might occur in the arrangement of Fig. 3 under certain conditions.

While the invention has been shown in but one form, it will be obvious to those skilled in the art that it is not so limited, but is susceptible of various changes and modifications without departing from the spirit thereof.

What is claimed is:

1. In combustion apparatus, wall structure defining an elongated combustion chamber having an igniting and burning first zone and a mixing and cooling second zone, the walls of said chamber being provided with openings for admission of primary air to said first zone and secondary air to said second zone, said secondary air openings providing for entry of air generally parallel to the longitudinal axis of the combustion chamber, and baffle structure associated with said secondary air openings for directing the secondary air at obtuse angles to the longitudinal axis of the combustion chamber, whereby good mixture of the secondary air with hot gases in the mixing and cooling zone is assured.

2. In combustion apparatus, wall structure defining a combustion chamber and an overlapping air space with a portion of said wall structure separating said chamber from said air space, said chamber comprising an upstream igniting and burning portion and a downstream mixing and cooling spac , that portion of said wall structure which separates the igniting and burning portion of the chamber from the overlapping air space being perforated to provide for admission of primary air to said igniting and burning portion, and that portion of the wall structure which separates the mixing and cooling portion of the chamber from the overlapping air space providing openings for admission of secondary air to said mixing and cooling portion, and baffle structure associated with said last-mentioned openings for directing the entering secondary air transversely into the hot gases within said mixing and cooling portion of the chamber.

3. Structure as specified in claim 2, wherein the combustion chamber is elongated from its upstream end to its downstream end, and said baffle structure extends generally normal to the longitudinal axis of said chamber.

4. In combustion apparatus, wall structure defining a combustion chamber and an overlapping air space, said wall structure including an annular wall separating said combustion chamber from said air space and provided with openings in the upstream portion thereof for admission of primary air to the upstream portion of the combustion chamber, at least the downstream portion of said annular wall comprising a plurality of annular sections each of greater diameter than the adjacent section at the upstream side thereof, said sections being concentric about the longitudinal axis of the combustion chamber and providing a stepped wall construction with the radial spaces between adjacent steps constituting annular passages for admission of secondary air longitudinally of the chamber, and inwardly-directed flanges carried by the downstream ends of a plurality of said wall sections for changing the direction of flow of entering secondary air from longitudinally of the combustion chamber to transversely thereof.

5. Structure as specified in claim 4, wherein the inwardly-directed flanges at opposite sides of the combustion chamber are disposed in staggered relation.

6. In combustion apparatus, wall structure defining a combustion chamber and an overlapping air space, said combustion chamber including an upstream ignition and burning zone and a downstream mixing and cooling zone; said wall structure including a first annular wall separating said igniting and burning zone from said overlapping air space and being perforated for admission of primary air from said air space to said igniting and burning zone, and a plurality of additional annular walls separating the mixing and cooling zone from the overlapping air space and disposed in stepped radially-spaced relation with the spaces between adjacent walls providing axial passages for admission of secondary air from the air space to the mixing and cooling zone; and means associated with said additional annular walls for promoting lateral flow of secondary air entering the mixing and cooling zone through the axial passages, whereby thorough mixing of secondary air and combustion gases is obtained.

7. In combustion apparatus, wall structure defining a combustion chamber elongated in the direction of flow of gases therethrough and comprising an upstream igniting and burning portion and a downstream mixing and cooling portion, that portion of the wall structure which defines the mixing and cooling portion of the combustion chamber comprising a plurality of annular walls disposed concentrically about a common axis in stepped relation with the spaces between adjacent steps providing annular passages for flow of secondary air axially to said mixing and cooling portion of the combustion chamber, and baffles extending into said mixing and cooling portion from at least two of said plurality of annular walls, whereby at least a portion of the secondary air entering the mixing and cooling portion axially is deflected transversely of said mixing and cooling portion.

8. In combustion apparatus, wall structure defining a combustion chamber having upstream igniting and burning portion and a downstream mixing and cooling portion; means for admitting primary air to the upstream igniting and burning portion; and means for admitting secondary air to the downstream mixing and cooling portion, said last-mentioned means comprising said wall structure provided with a plurality of openings communicating with said mixing and cooling portion, and baffle means associated with said openings for directing the entering secondary air transversely of the combustion chamber mixing and cooling portion.

EGON A. DE ZUBAY.

REFERENCES CITED

The following references are of record in the file of this patent:

UNITED STATES PATENTS

| Number | Name | Date |
| --- | --- | --- |
| 2,206,553 | Nagel | July 2, 1940 |
| 2,268,464 | Seippel | Dec. 30, 1941 |